(12) United States Patent
Bruno et al.

(10) Patent No.: US 10,597,162 B2
(45) Date of Patent: Mar. 24, 2020

(54) MIXING BLEED AND RAM AIR AT A TURBINE INLET

(71) Applicant: Hamilton Sundstrand Corporation, Charlotte, NC (US)

(72) Inventors: Louis J. Bruno, Ellington, CT (US); Harold W. Hipsky, Willington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 248 days.

(21) Appl. No.: 15/604,510

(22) Filed: May 24, 2017

(65) Prior Publication Data
US 2017/0341767 A1 Nov. 30, 2017

Related U.S. Application Data

(60) Provisional application No. 62/341,922, filed on May 26, 2017.

(51) Int. Cl.
*B64D 13/08* (2006.01)
*B64D 13/02* (2006.01)
(Continued)

(52) U.S. Cl.
CPC ............. *B64D 13/08* (2013.01); *B64D 13/02* (2013.01); *B64D 13/06* (2013.01); *F01D 5/06* (2013.01); *F01D 17/105* (2013.01); *F04D 25/045* (2013.01); *F04D 29/5826* (2013.01); *B64D 2013/0618* (2013.01); *B64D 2013/0648* (2013.01); *F05D 2260/213* (2013.01); *F05D 2260/606* (2013.01); *Y02T 50/56* (2013.01)

(58) Field of Classification Search
CPC ................... B64D 13/02; B64D 13/04; B64D 2013/0603; B64D 2013/0618; B64D 13/00; B64D 13/06; B64D 2013/003; B60H 1/3442
USPC ................. 454/71, 76; 62/DIG. 5; 244/118.5
See application file for complete search history.

(56) References Cited

U.S. PATENT DOCUMENTS

| 2,800,002 A | 7/1957 | Seed |
| 3,428,242 A | 2/1969 | Rannenberg |

(Continued)

FOREIGN PATENT DOCUMENTS

| CA | 2968745 A1 | 11/2017 |
| EP | 1112930 A2 | 7/2001 |

(Continued)

OTHER PUBLICATIONS

Search Report dated Oct. 5, 2017 in European Patent Application No. 17173077.

(Continued)

*Primary Examiner* — Steven B McAllister
*Assistant Examiner* — Ko-Wei Lin
(74) *Attorney, Agent, or Firm* — Cantor Colburn LLP

(57) ABSTRACT

An airplane is provided. The airplane includes a first medium, a second medium, and an air conditioning. The air conditioning system includes a first turbine, a compressor, and a mixing point. The compressor is located upstream of the turbine in a flow path of the first medium. The mixing point is a location at which the first medium mixes with the second medium. The mixing point is downstream of the compressor and upstream of the turbine.

8 Claims, 14 Drawing Sheets

(51) Int. Cl.
   *B64D 13/06* (2006.01)
   *F01D 5/06* (2006.01)
   *F01D 17/10* (2006.01)
   *F04D 25/04* (2006.01)
   *F04D 29/58* (2006.01)

(56) References Cited

U.S. PATENT DOCUMENTS

| | | | |
|---|---|---|---|
| 4,021,215 A | 5/1977 | Rosenbush | |
| 4,261,416 A | 4/1981 | Hamamoto | |
| 4,374,469 A | 2/1983 | Rannenberg | |
| 4,604,028 A | 8/1986 | Yeaple et al. | |
| 5,257,003 A | 10/1993 | Mahoney | |
| 5,299,763 A | 4/1994 | Bescoby et al. | |
| 5,461,882 A | 10/1995 | Zywiak | |
| 5,473,899 A | 12/1995 | Viteri | |
| 5,899,085 A | 5/1999 | Williams | |
| 5,911,388 A | 6/1999 | Severson et al. | |
| 5,967,461 A | 10/1999 | Farrington | |
| 6,199,387 B1 | 3/2001 | Sauterleute | |
| 6,257,003 B1 | 7/2001 | Hipsky | |
| 6,505,474 B2 | 1/2003 | Sauterleute et al. | |
| 6,519,969 B2 | 2/2003 | Sauterleute | |
| 6,526,775 B1 | 3/2003 | Asfia et al. | |
| 6,615,606 B2 | 9/2003 | Zywiak | |
| 6,681,592 B1 | 1/2004 | Lents et al. | |
| 6,776,002 B1 | 8/2004 | Ho | |
| 6,845,630 B2 | 1/2005 | Bruno | |
| 6,848,261 B2 | 2/2005 | Claeys | |
| 7,222,499 B2 | 5/2007 | Hunt | |
| 7,607,318 B2 | 10/2009 | Lui et al. | |
| 7,624,592 B2 | 12/2009 | Lui et al. | |
| 7,950,606 B2 | 5/2011 | Atkey et al. | |
| 8,042,354 B1 | 10/2011 | Dziorny et al. | |
| 8,099,973 B2 | 1/2012 | Sampson et al. | |
| 8,302,407 B2 | 11/2012 | Alecu | |
| 8,985,966 B2 | 3/2015 | Sampson et al. | |
| 9,109,514 B2 | 8/2015 | Cheong | |
| 9,169,024 B2 | 10/2015 | Voinov | |
| 9,211,954 B2 | 12/2015 | Barkowsky | |
| 9,481,468 B1 | 11/2016 | Schiff | |
| 9,555,893 B2 | 1/2017 | Squier | |
| 9,849,990 B2 | 12/2017 | Bruno | |
| 10,059,458 B2 | 8/2018 | Squier | |
| 10,137,993 B2 | 11/2018 | Bruno et al. | |
| 10,144,517 B2 | 12/2018 | Bruno et al. | |
| 10,232,948 B2 | 3/2019 | Bruno et al. | |
| 2001/0004837 A1 | 6/2001 | Sauterleute | |
| 2003/0051500 A1 | 3/2003 | Asfia | |
| 2003/0126880 A1 | 7/2003 | Zywiak | |
| 2004/0014418 A1 | 1/2004 | Farag et al. | |
| 2004/0014419 A1 | 1/2004 | Lents et al. | |
| 2004/0055309 A1 | 3/2004 | Bellows | |
| 2006/0059927 A1 | 3/2006 | Zywiak et al. | |
| 2006/0196216 A1 | 9/2006 | Bruno et al. | |
| 2007/0266695 A1 | 11/2007 | Lui et al. | |
| 2009/0117840 A1 | 5/2009 | Kresser | |
| 2009/0317248 A1 | 12/2009 | Tanaka et al. | |
| 2010/0043794 A1 | 2/2010 | Saito et al. | |
| 2010/0323601 A1* | 12/2010 | Cremers | B64D 13/06 454/76 |
| 2012/0118528 A1 | 5/2012 | Al-Ali | |
| 2012/0156027 A1 | 6/2012 | Merritt et al. | |
| 2013/0033348 A1 | 2/2013 | Saito et al. | |
| 2013/0118190 A1 | 5/2013 | Bruno et al. | |
| 2013/0133348 A1* | 5/2013 | Squier | B64D 13/08 62/172 |
| 2013/0136590 A1 | 5/2013 | Higashimori | |
| 2014/0109603 A1 | 4/2014 | Fernandes et al. | |
| 2014/0238043 A1 | 8/2014 | Sokhey et al. | |
| 2014/0353461 A1 | 12/2014 | Vignali et al. | |
| 2015/0013355 A1 | 1/2015 | Klimpel et al. | |
| 2015/0065025 A1 | 3/2015 | Bruno et al. | |
| 2015/0251765 A1 | 9/2015 | Jonqueres et al. | |
| 2015/0251766 A1 | 9/2015 | Atkey | |
| 2015/0275844 A1 | 10/2015 | Winkler et al. | |
| 2015/0307195 A1 | 10/2015 | Bruno | |
| 2015/0329210 A1 | 11/2015 | Bammann | |
| 2016/0083100 A1 | 3/2016 | Bammann | |
| 2017/0021296 A1 | 1/2017 | Paul et al. | |
| 2017/0129614 A1 | 5/2017 | Bammann et al. | |
| 2017/0341759 A1 | 11/2017 | Bruno et al. | |
| 2017/0341760 A1 | 11/2017 | Hall et al. | |
| 2017/0341761 A1 | 11/2017 | Bruno et al. | |
| 2017/0341768 A1 | 11/2017 | Bruno et al. | |
| 2017/0342838 A1 | 11/2017 | Bruno et al. | |
| 2017/0342899 A1 | 11/2017 | Bruno et al. | |
| 2018/0051945 A1 | 2/2018 | Hanov et al. | |
| 2018/0057175 A1 | 3/2018 | Klimpel et al. | |

FOREIGN PATENT DOCUMENTS

| | | |
|---|---|---|
| EP | 1129941 A2 | 9/2001 |
| EP | 1386837 | 2/2004 |
| EP | 2597036 A2 | 5/2013 |
| EP | 2602191 A1 | 6/2013 |
| EP | 2845804 A1 | 3/2015 |
| EP | 2937287 A1 | 10/2015 |
| EP | 2947012 A1 | 11/2015 |
| JP | 5909163 B2 | 4/2016 |
| WO | 03035472 A1 | 5/2003 |
| WO | 2016004021 A1 | 1/2016 |

OTHER PUBLICATIONS

Search Report dated Oct. 5, 2017 in European Patent Application No. 17172816.
Search Report dated Oct. 6, 2017 in European Patent Application No. 17172822.
Search Report dated Oct. 9, 2017 in European Patent Application No. 17172889.
Search Report dated Oct. 11, 2017 in European Patent Application No. 17172834.
Search Report dated Oct. 20, 2017 in European Patent Application No. 17172830.
Search Report dated Oct. 20, 2017 in European Patent Application No. 17172757.
Search Report dated Oct. 25, 2017 in European Patent Application No. 17173043.
Search Report dated Nov. 2, 2017 in European Patent Application No. 17172891.
Search Report dated Nov. 10, 2017 in European Patent Application No. 17172821.
European Office Action for European Application No. 17172757.1 dated Nov. 30, 2018; 6 Pages.
Extended Search Report dated Jun. 7, 2018 in European Patent Application No. 17204787.

* cited by examiner

MIXING BLEED AND RAM AIR AT A TURBINE INLET

CROSS-REFERENCE TO RELATED APPLICATION

This application claims benefit of priority to U.S. Provisional Application No. 62/341,922 filed May 26, 2016, the disclosure of which is incorporated herein by reference in its entirety.

BACKGROUND

In general, contemporary air condition systems are supplied a pressure at cruise that is approximately 30 psig to 35 psig. The trend in the aerospace industry today is towards systems with higher efficiency. One approach to improve airplane efficiency is to eliminate the bleed air entirely and use electrical power to compress outside air. A second approach is to use lower engine pressure. The third approach is to use the energy in the bleed air to compress outside air and bring it into the cabin.

BRIEF DESCRIPTION

According to one or more embodiments, an airplane is provided. The airplane comprises a first medium; a second medium; and an air conditioning system comprising: a first turbine, a compressor located upstream of the turbine in a flow path of the first medium, and a mixing point at which the first medium mixes with the second medium, wherein the mixing point is downstream of the compressor and upstream of the turbine.

According to one or more embodiments or the above airplane embodiment, the airplane can comprise a heat exchanger configured to reject heat from the first medium to a third medium.

According to one or more embodiments or any of the above airplane embodiments, the airplane can comprise a second heat exchanger configured to reject heat from the second medium to the third medium.

According to one or more embodiments or any of the above airplane embodiments, the mixing point can be located downstream of the heat exchanger and the second heat exchanger.

According to one or more embodiments or any of the above airplane embodiments, the airplane can comprise a third heat exchanger located downstream of the heat exchanger in the flow path of the first medium and located upstream of the mixing point.

According to one or more embodiments or any of the above airplane embodiments, the airplane can comprise a third heat exchanger located downstream of the second heat exchanger in a flow path of the second medium and located upstream of the mixing point.

According to one or more embodiments or any of the above airplane embodiments, the airplane can comprise a third heat exchanger downstream of the mixing point.

According to one or more embodiments or any of the above airplane embodiments, the airplane can comprise a flow of a third medium.

According to one or more embodiments or any of the above airplane embodiments, the third medium can comprise cabin discharge air.

According to one or more embodiments or any of the above airplane embodiments, the airplane can comprise a fourth heat exchanger rejecting heat from the first medium to the third medium.

According to one or more embodiments or any of the above airplane embodiments, the fourth heat exchanger can be upstream of the second heat exchanger in the flow path of the first medium.

According to one or more embodiments or any of the above airplane embodiments, the airplane can comprise a second turbine configured to receive a flow of the third medium and to power the compressor.

According to one or more embodiments or any of the above airplane embodiments, the second turbine can be downstream of a fourth heat exchanger in the flow of the third medium.

According to one or more embodiments or any of the above airplane embodiments, the airplane can comprise a single ram air heat exchanger located downstream of the mixing point.

According to one or more embodiments or any of the above airplane embodiments, the first medium can comprise bleed air, and the second medium can comprise fresh air Additional features and advantages are realized through the techniques of the embodiments herein. Other embodiments are described in detail herein and are considered a part of the claims. For a better understanding of the embodiments with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages thereof are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the FIGS.

Embodiments herein provide an environmental control system of an aircraft that mixes mediums from different sources and uses the different energy sources to power the environmental control system and to provide cabin pressurization and cooling at a high fuel burn efficiency. The medium can generally be air, while other examples include gases, liquids, fluidized solids, or slurries.

Figure 1:
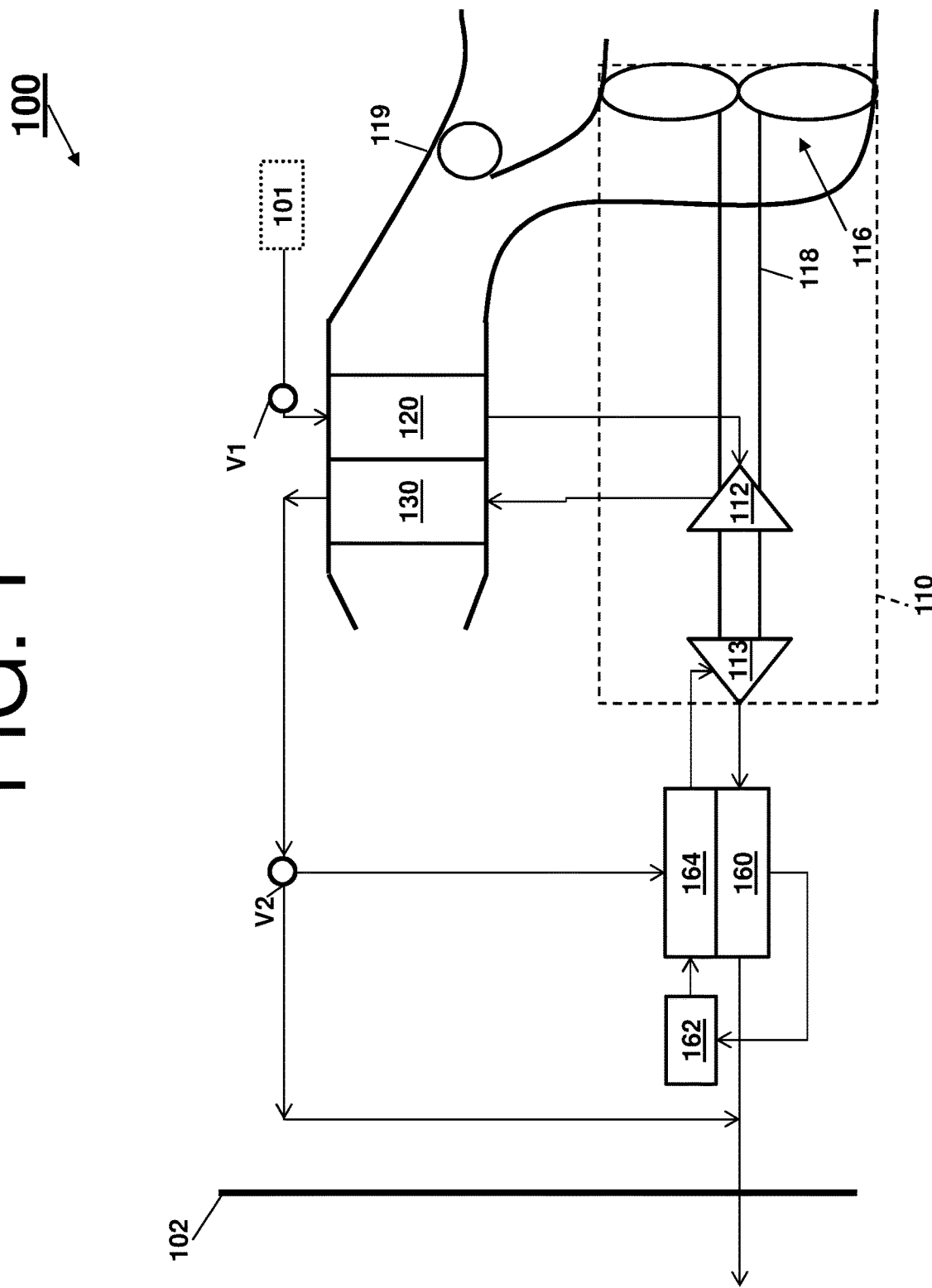
FIG. 1 is a diagram of a schematic of an environmental control system according to an embodiment.

Turning to FIG. 1, a system 100 that receives a medium from an inlet 101 and provides a conditioned form of the medium to a chamber 102 is illustrated. The system 100 comprises a compressing device 110. As shown, the compressing device 110 comprises a compressor 112, a turbine 113, a fan 116, and a shaft 118. The system 100 also comprises a primary heat exchanger 120, a secondary heat exchanger 130, a condenser 160, a water extractor 162, and a reheater 164.

The compressing device 110 is a mechanical device that includes components for performing thermodynamic work on the medium (e.g., extracts work from or works on the medium by raising and/or lowering pressure and by raising and/or lowering temperature). Examples of the compressing device 110 include an air cycle machine, a three-wheel air cycle machine, a four-wheel air cycle machine, etc.

The compressor 112 is a mechanical device that raises the pressure of the medium received from the inlet 101. Examples of compressor types include centrifugal, diagonal or mixed-flow, axial-flow, reciprocating, ionic liquid piston, rotary screw, rotary vane, scroll, diaphragm, air bubble, etc. Further, compressors can be driven by a motor or the medium via the turbine 113.

The turbine 113 is mechanical device that drives the compressor 112 and the fan 116 via the shaft 118. The fan 116 (e.g., a ram air fan) is a mechanical device that can force via push or pull methods air through the shell 119 across the heat exchangers 120 and 130 at a variable flow rate to control temperatures. The shell 119 receives and directs a medium (such as ram air) through the system 100. In general, ram air is outside air used as a heat sink by the system 100.

The heat exchangers 120 and 130 are devices built for efficient heat transfer from one medium to another. Examples of heat exchangers include double pipe, shell and tube, plate, plate and shell, adiabatic wheel, plate fin, pillow plate, and fluid heat exchangers.

The condenser 160 and the reheater 164 are particular types of heat exchangers. The water extractor 162 is a mechanical device that performs a process of taking water from the medium. Together, the condenser 160, the water extractor 162, and/or the reheater 164 can combine to be a high pressure water separator.

The elements of the system 100 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system 100. Valves can be operated by actuators, such that flow rates of the medium in any portion of the system 100 can be regulated to a desired value.

As shown in FIG. 1, the medium can flow from an inlet 101 through the system 100 to a chamber 102, as indicated by solid-lined arrows. A vale V1 (e.g., a mass flow control valve) controls the flow of the medium from the inlet 101 to the system 100. Further, a vale V2 controls whether the flow of the medium from the secondary heat exchanger 130 bypasses the turbine 113 in accordance with a mode of the system 100. A combination of components of the system 100 can be referred to as an air conditioning pack or a pack. The pack can begin at a vale V1 and conclude as air exits the condenser 162.

The system 100 will now be described in view of the above aircraft embodiment. In the aircraft embodiment, the medium can be air and the system 100 can be an environmental control system. The air supplied to the environmental control system at the inlet 101 can be said to be "bled" from a turbine engine or an auxiliary power unit. When the air is being provided by the turbine engine or the auxiliary power unit connected to the environmental control system, such as from the inlet 101, the air can be referred to as bleed air (e.g., pressurized air that comes from an engine or an auxiliary power unit). The temperature, humidity, and pressure of the bleed air vary widely depending upon a compressor stage and a revolutions per minute of the turbine engine.

Figure 2A:
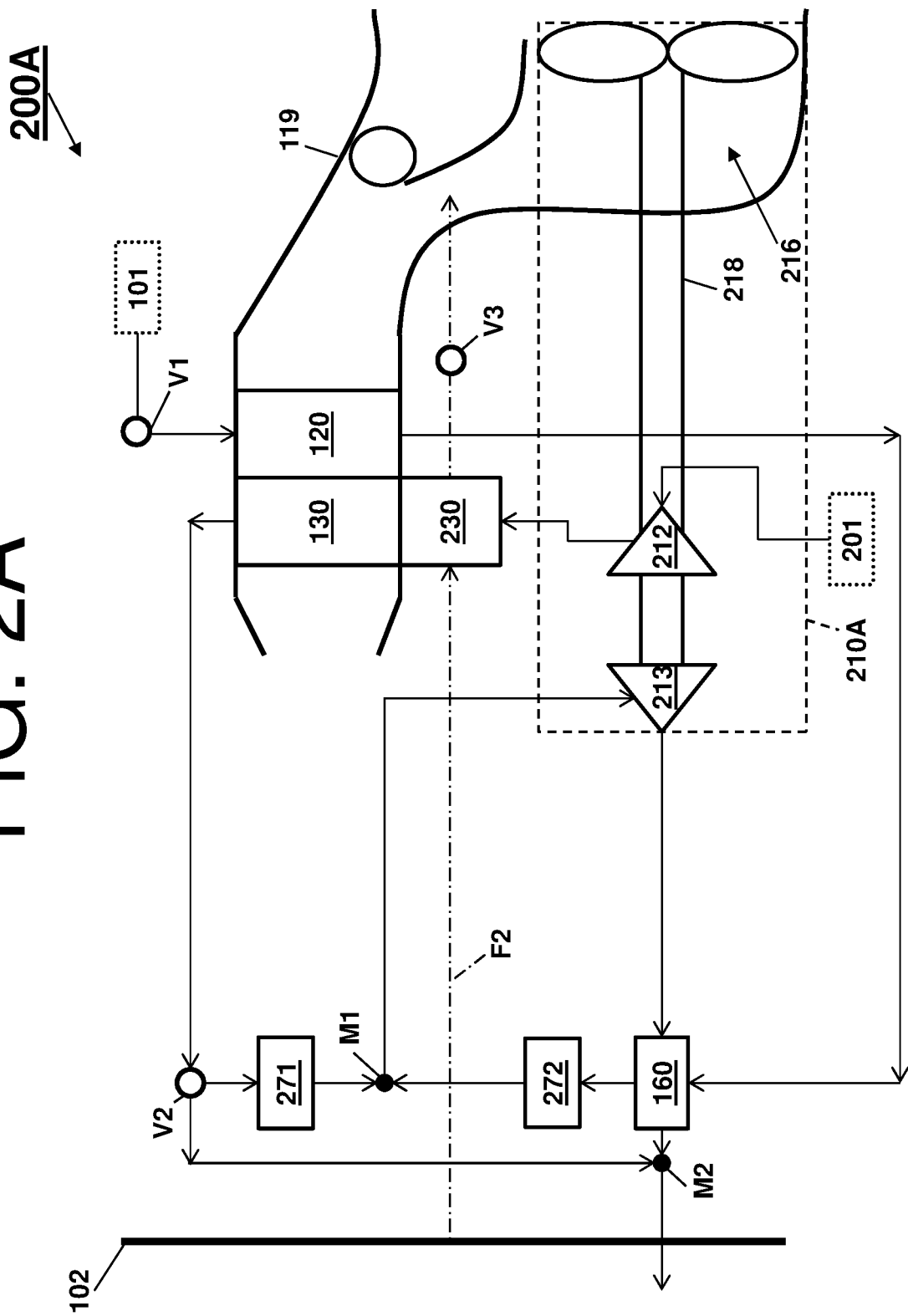
FIG. 2A is a diagram of a schematic of an environmental control system that includes at least one mixing point according to an embodiment.
Figure 2B:
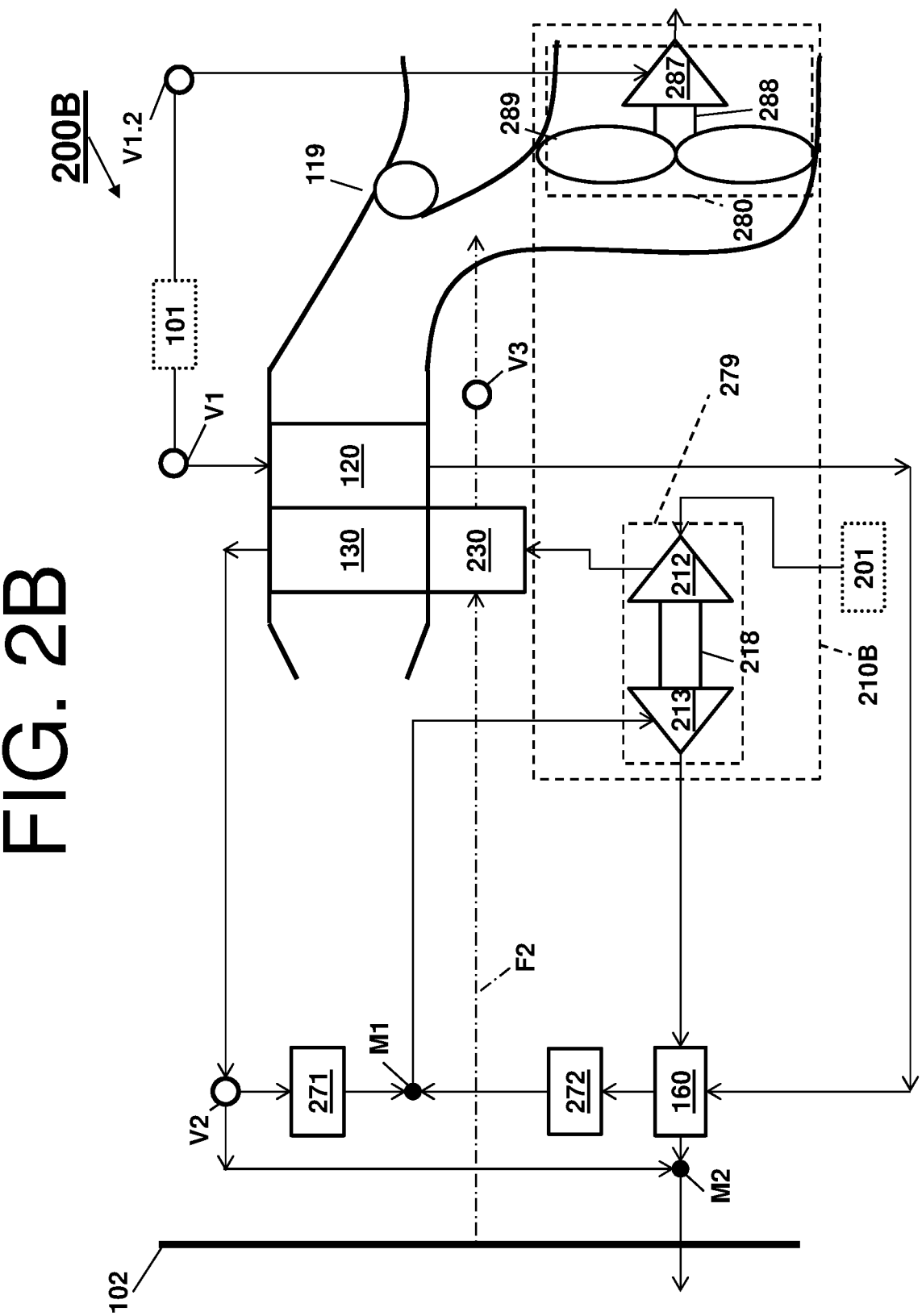
FIG. 2B is a variation of the environmental control system of FIG. 2A according to an embodiment.
Figure 2C:
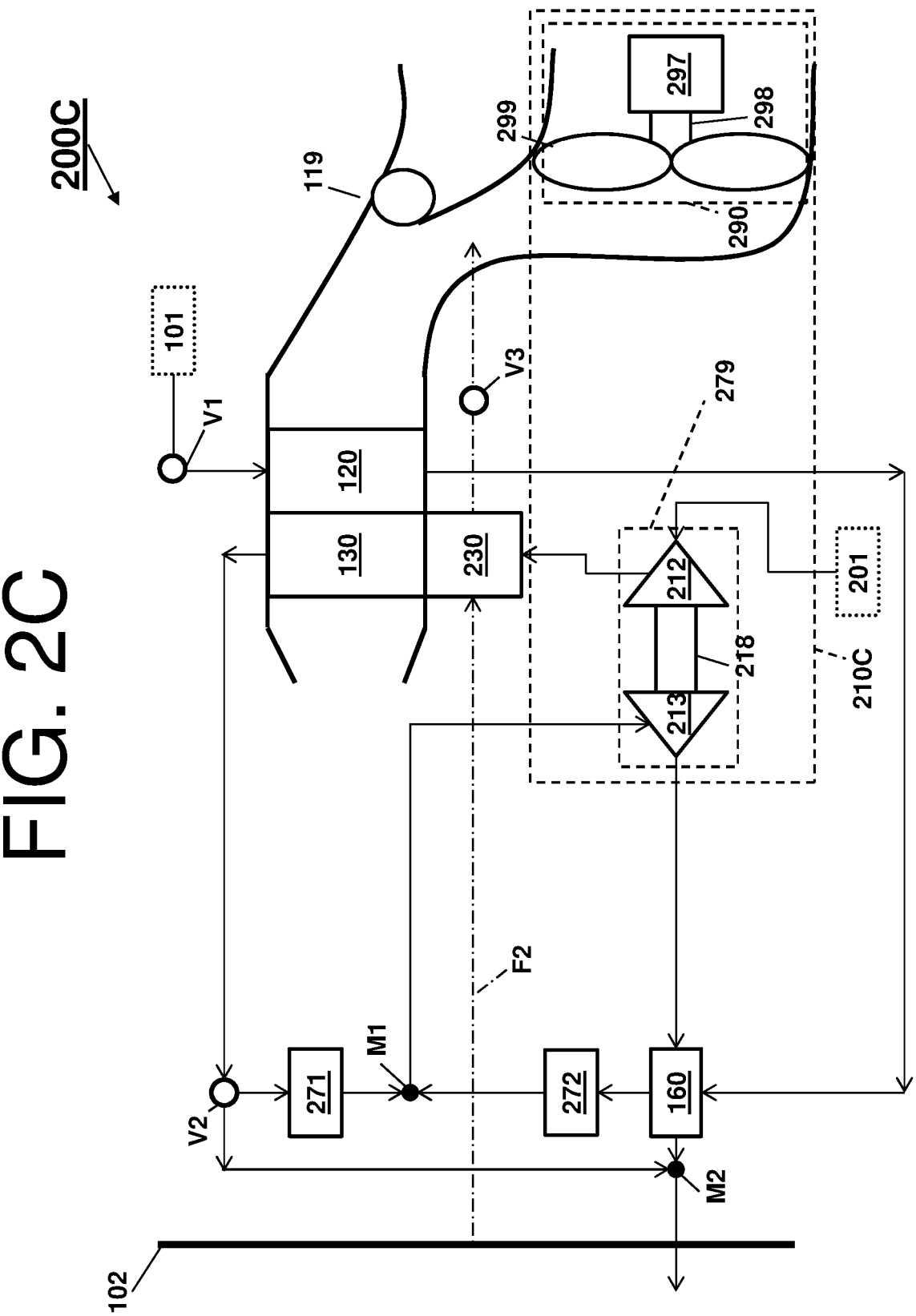
FIG. 2C is a variation of the environmental control system of FIG. 2A according to an embodiment.

Turning now to FIGS. 2A, 2B, and 2C, a schematic of environmental control systems 200A, 200B, and 200C (e.g., embodiments of system 100) are depicted according to embodiments, as they can be installed on an aircraft. In operation, the environmental control systems 200A, 200B, and 200C mix fresh air with bleed air. Components of the system 100 that are similar to the environmental control systems 200A, 200B, and 200C have been reused for ease of explanation, by using the same identifiers, and are not re-introduced.

FIG. 2A illustrates the environmental control system 200A to further include an inlet 201, a compressing device 210A (that comprises a compressor 212, a turbine 213, a fan 216, and a shaft 218), an outflow heat exchanger 230, a water collector 271, a water collector 272, and a valve V3, along with a path for a medium denoted by a dot-dashed line F2 (where the medium can be provided from the chamber 102 into the environmental control system 200A).

In view of the above aircraft embodiment, when the medium is being provided from the chamber 102 (e.g., air leaving a pressurized volume, cabin of the aircraft, or cabin and flight deck of the aircraft), the medium can be referred as chamber discharge air (also known as cabin discharge air). Note that in one or more embodiments, an exhaust of the cabin discharge air from the environmental control system 200A can be released through the shell 119 or sent to a cabin pressure control system. The cabin discharge air can also be released through an outflow valve (a.k.a. an outflow control valve and a thrust recovery outflow valve). For example, when the cabin discharge air from the outflow heat exchanger 230 is coupled to the outflow valve, the outflow heat exchanger 230 increases the energy in the cabin discharge air, which increases the thrust recovered by the outflow valve.

Further, when a medium is being provided from the inlet 201, the medium can be referred to as fresh outside air (also known as fresh air or outside air destined to enter the pressurized volume or chamber 102). The fresh air can be procured by one or more scooping mechanisms, such as an impact scoop or a flush scoop. Thus, the inlet 201 can be considered a fresh air inlet.

In a low altitude operation of the environmental control system 200A, high-pressure high-temperature air from either the turbine engine or the auxiliary power unit via inlet 101 through the valve V1 enters the primary heat exchanger 120. The primary heat exchanger 120 cools the high-pressure high-temperature air to nearly ambient temperature to produce cool pressurized air. This cool pressurized air enters the condenser 160, where it is further cooled by air from the turbine 213 of the compressing device 210A. Upon exiting the condenser 160, the cool pressurized air enters the water extractor 272 so that moisture in the air is removed.

The cool pressurized air is then mixed with fresh air sourced from inlet 201 to produce mixed air. The fresh air prior to being mixed is compressed by the compressor 212 (to approximately the same pressure as the cool high pressure air). The act of compressing the fresh air, heats the fresh air. The compressed fresh air then enters the outflow heat exchanger 230 and is cooled by the cabin discharge air (see the dot-dashed line F2) to produce cooled compressed fresh air. The outflow heat exchanger 230 exhausts the cabin discharge through the shell 119, to a cabin pressure control system, or the outflow valve an outflow valve (note that a valve V3 can control the destination of the exhaust of the outflow heat exchanger 230). The cooled compressed fresh air then enters the secondary heat exchanger 130 and is further cooled to nearly ambient temperature. The air exiting the secondary heat exchanger 130 is directed by the valve V2 to the water extractor 271, where any free moisture is removed, to produce cool pressurized air.

Two air flows are mixed upstream of the turbine 213 to produce the mixed air. The two air flows include the cool pressurized fresh air sourcing from 201, and the cool pressurized bleed air sourcing from inlet 101. This upstream location can be considered a first mixing point M1 of the environmental control system 200A. The mixed air enters and leaves the turbine 213. The mixed air then enters the condenser 160 to cool the bleed air leaving the primary heat exchanger 120. The mixed air is then sent to condition the chamber 102. Thus, in the environmental control system 200A, bleed air can drive a boot strap air cycle, where the compressing device 210A receives fresh air. For instance, the two mediums (e.g., bleed air and fresh air) mix upstream of the turbine 213, such as at an inlet of the turbine 213 and enters the turbine 213 where power is extracted. This power is used to drive the compressor 212 that receives the fresh air.

The mixed air enters the turbine 213 through a nozzle. The mixed air is expanded across the turbine 213 and work extracted from the mixed air. This extracted work drives the compressor 212 used to compress the fresh air. This extracted work also drives the fan 216, which is used to move air (e.g., ram air) through the primary heat exchanger 120 and the secondary heat exchanger 130 (also known as ram air heat exchangers).

This low altitude operation can be consider a low altitude mode. The low altitude mode can be used for ground and low altitude flight conditions, such as ground idle, taxi, take-off, and hold conditions.

In high altitude operation of the environmental control system 200, the fresh outside air can be mixed downstream of the turbine 213 (rather than upstream of the turbine 213, at an inlet of the turbine 213, and/or at the first mixing point M1). In this situation, the air exiting the secondary heat exchanger 130 is directed by the valve V2 to downstream of the turbine 213. The location at which this cool medium pressure air mixes with the bleed air, which is sourced from the inlet 101 and exiting the condenser 160, can be considered a second mixing point M2 of the environmental control system 200. Note that the mixing point M2 can be location at any point downstream of the turbine 213, such as downstream of the condenser 160 as shown in FIG. 2.

This high altitude operation can be considered a high altitude mode. The high altitude mode can be used at high altitude cruise, climb, and descent flight conditions. In the high altitude mode, fresh air aviation requirements for passengers are met by mixing the two air flows (e.g., the fresh outside air sourcing from 201 and the bleed air sourcing from inlet 101). Further, depending on an altitude of the aircraft, an amount of bleed air needed can be reduced. In this way, the environmental control system 200 provides bleed air reduction ranging from 40% to 75% to provide higher efficiencies with respect to engine fuel burn than contemporary airplane air systems.

FIGS. 2B and 2C illustrate variations of the environmental control system 200A. Turning now to FIG. 2B, a schematic of an environmental control system 200B (e.g., an embodiment of the environmental control system 200A) is depicted according to an embodiment. Components of the systems 100 and 200A that are similar to the environmental control system 200B have been reused for ease of explanation, by using the same identifiers, and are not re-introduced. Alternative components of the environmental control system 200B include a compressing device 210B that comprises a component 279 and a component 280. The component 279 comprises the compressor 212, the turbine 213, and the shaft 318. The component 280 can be a rotating device (e.g., turbine driven fan), which comprises a turbine 287, a shaft 288, and a fan 289. The environmental control system 200B can also comprise a secondary path for the medium sourced from the inlet 101 (e.g., a valve V1.2 can provide the medium from the inlet 101 to an inlet of the turbine 287).

The environmental control system 300 operates similarly to the environmental control system 200 in that different mixing points M1 and M2 are utilized based on the mode of operation. In addition, the environmental control system 300 separates the ram air fan (e.g., fan 216) from the air cycle machine (e.g., the compressing device 210A) and provides the ram air fan within the rotating device (e.g., the component 280). The turbine 287 of the component 280 is powered by the bleed air sourced from the inlet 101 flowing through the valve V1.2.

Turning now to FIG. 2C, a schematic of an environmental control system 200C (e.g., an embodiment of the environmental control system 200A) is depicted according to an embodiment. Components of the systems 100, 200A, and 200B that are similar to the environmental control system 200C have been reused for ease of explanation, by using the same identifiers, and are not re-introduced. Alternative components of the environmental control system 200C include a compressing device 210C that comprises a component 279 and a component 280. The component 290 can be a rotating device (e.g., integral rotor or tip turbine), which comprises a turbine 297, a shaft 298, and a motor 289.

The environmental control system 200C operates similarly to the environmental control system 200A in that different mixing points are utilized based on the mode of operation. In addition, the environmental control system 200C separates the ram air fan (e.g., fan 216) from the air cycle machine (e.g., the compressing device 210A) and provides the ram air fan within the rotating device (e.g., the component 290). The motor 297 of the component 290 is powered by electric power.

Figure 3A:
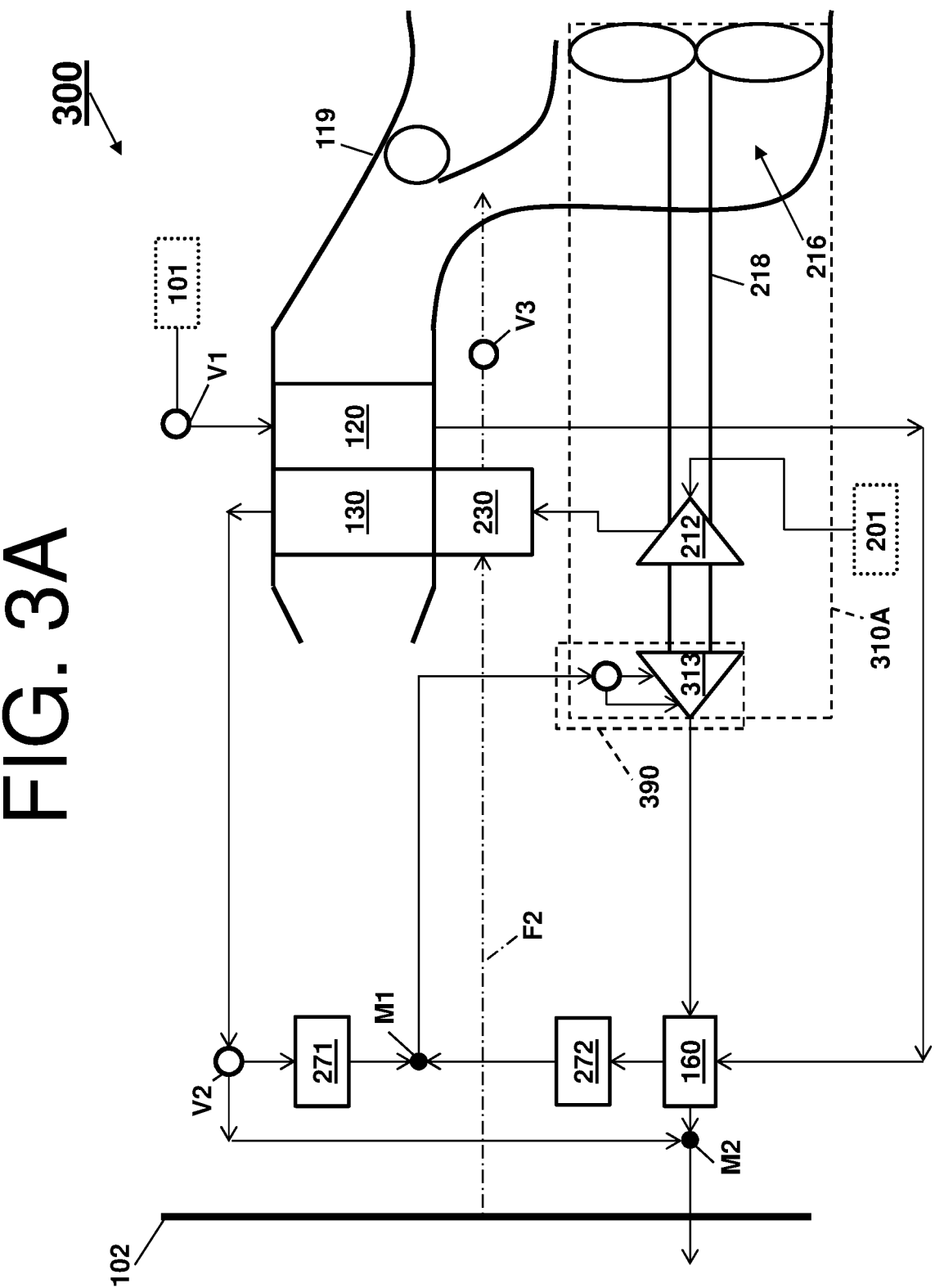
FIG. 3A is a diagram of a schematic of an environmental control system that includes at least one mixing point according to another embodiment.
Figure 3B:
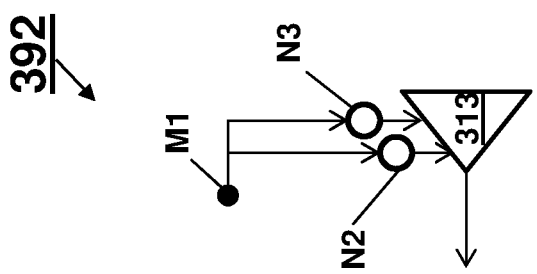
FIG. 3B illustrates multiple nozzle configurations according to an embodiment.
Figure 3B:
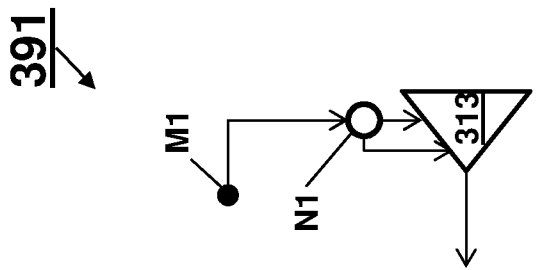

FIG. 3A illustrates a schematic of an environmental control system 300 as a variation of the environmental control systems 200A, 200B, and 200C according to an embodiment. Components of the systems 100 and 200A, 200B, and 200C that are similar to the environmental control system 300 have been reused for ease of explanation, by using the same identifiers, and are not re-introduced. Alternative components of the environmental control system 300 include the compressing device 210A comprising a multiple nozzle configuration 390. The multiple nozzle configuration 390 enables a varying nozzle area based on conditions surrounding the aircraft without the added complication of variable area turbine. The multiple nozzle configuration 390 includes the turbine 313 with one or more nozzles. Further, each of the one or more nozzles can receive a medium according to mechanisms external to the turbine 313. Turning now to FIG. 3B, embodiments of the multiple nozzle configuration 390 are shown as nozzle configurations 391 and 392.

The nozzle configuration 391 includes the turbine 313 and a valve N1. The valve N1 regulates the flow of mixed air (e.g., from the mixing point M1) to the turbine 313. The valve N1 operates in a first mode, a second mode, or a third mode. The first mode or a limit mode is when all of the mixed air is supplied to a nozzle of the turbine 313 with a smallest area. The second mode or intermediate mode is when all of the mixed air is supplied to a nozzle of the turbine 313 with a largest area. The third mode or open mode is when all of the mixed air is supplied to both nozzles of the turbine 313, therefor providing a maximum flow of the mixed air. In an embodiment, the first nozzle can be 0.3 inches and the second nozzle can be 0.9 inches. In turn, the nozzle area in the first mode is 0.3 inches, the nozzle area in the second mode is 0.9 inches, and the nozzle area in the third mode is 1.3 inches.

The nozzle configuration 392 includes the turbine 313 and valves N2 and N3. The valve N2 regulates the flow of mixed air (e.g., from the mixing point M1) to a first nozzle of the turbine 313. The valve N3 regulates the flow of mixed air (e.g., from the mixing point M1) to a second nozzle of the turbine 313. The first nozzle of the turbine 313 includes an area that is smaller than that of the second nozzle of the turbine 313. The valves N2 and N3 operate in accordance with a first mode, a second mode, or a third mode. The first mode or a limit mode is when only the valve N2 supplies the mixed air to the first nozzle of the turbine 313 (e.g., the valve N2 provides the pressurized medium to the first nozzle and the valve N3 blocks the pressurized medium from the second nozzle). The second mode or an intermediate mode is when only the valve N3 supplies the mixed air to the second nozzle of the turbine 313 (e.g., the valve N3 provides the pressurized medium to the second nozzle and the valve N2 blocks the pressurized medium from the first nozzle). The third mode or open mode is when both valves N2 and N3 supply the mixed air to both nozzles of the turbine 313, therefor providing a maximum flow of the mixed air (e.g., the valve N2 provides the pressurized medium to the first nozzle and the valve N3 provides the pressurized medium from the second nozzle).

In view of the aircraft example and with respect to any of the above nozzle configurations 391 and 392, when operating the environmental control system 300 on the ground, a third mode is utilized. Further, when in flight, the environmental control system 300 can utilize the first mode, the second mode, or the third mode in accordance with a pressure of the bleed air. In turn, the environmental control system 300 can maximize the use of the bleed pressure without the added complication of variable area turbine.

Figure 4A:
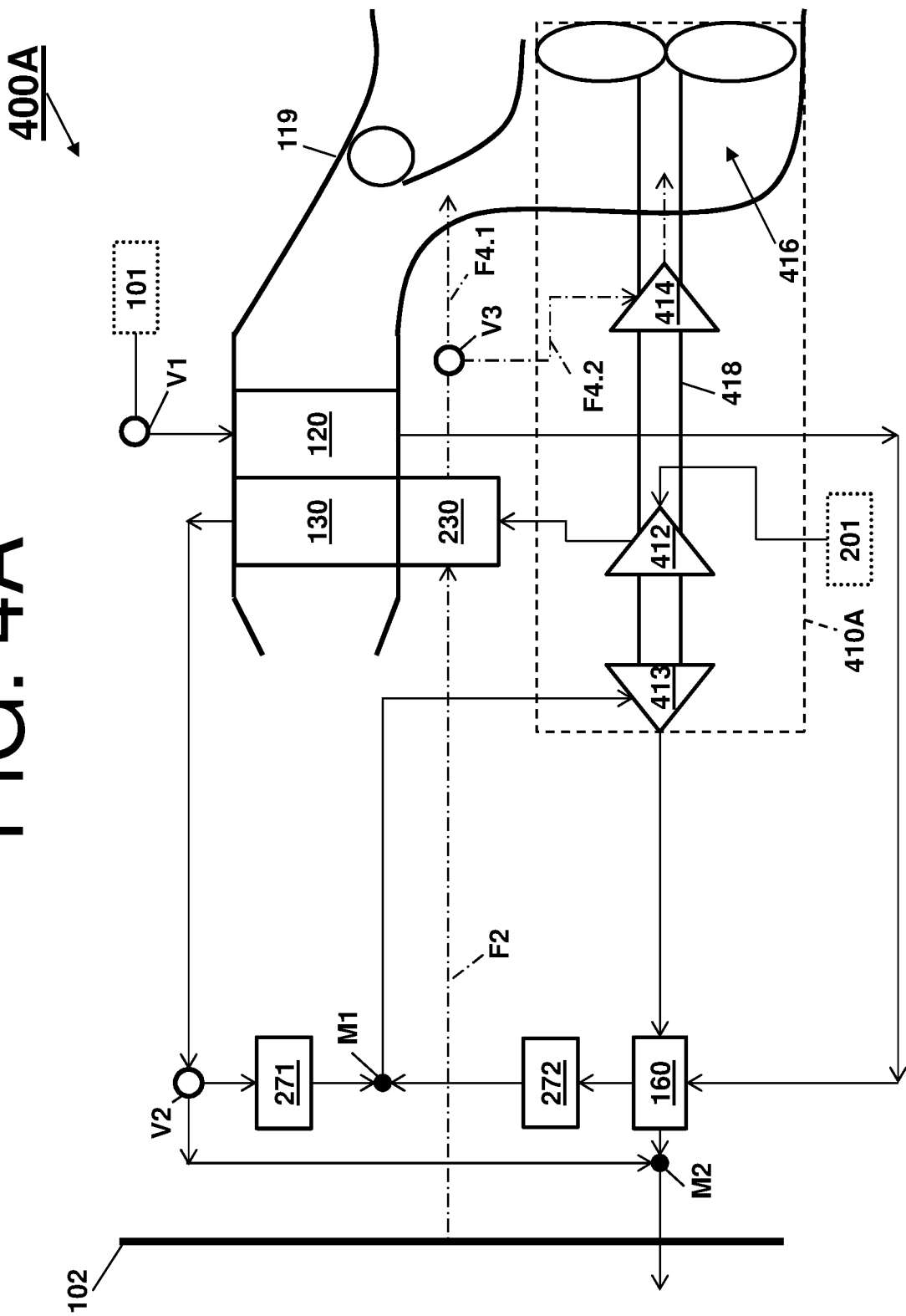
FIG. 4A is a diagram of a schematic of an environmental control system that includes at least one mixing point according to another embodiment.
Figure 4B:
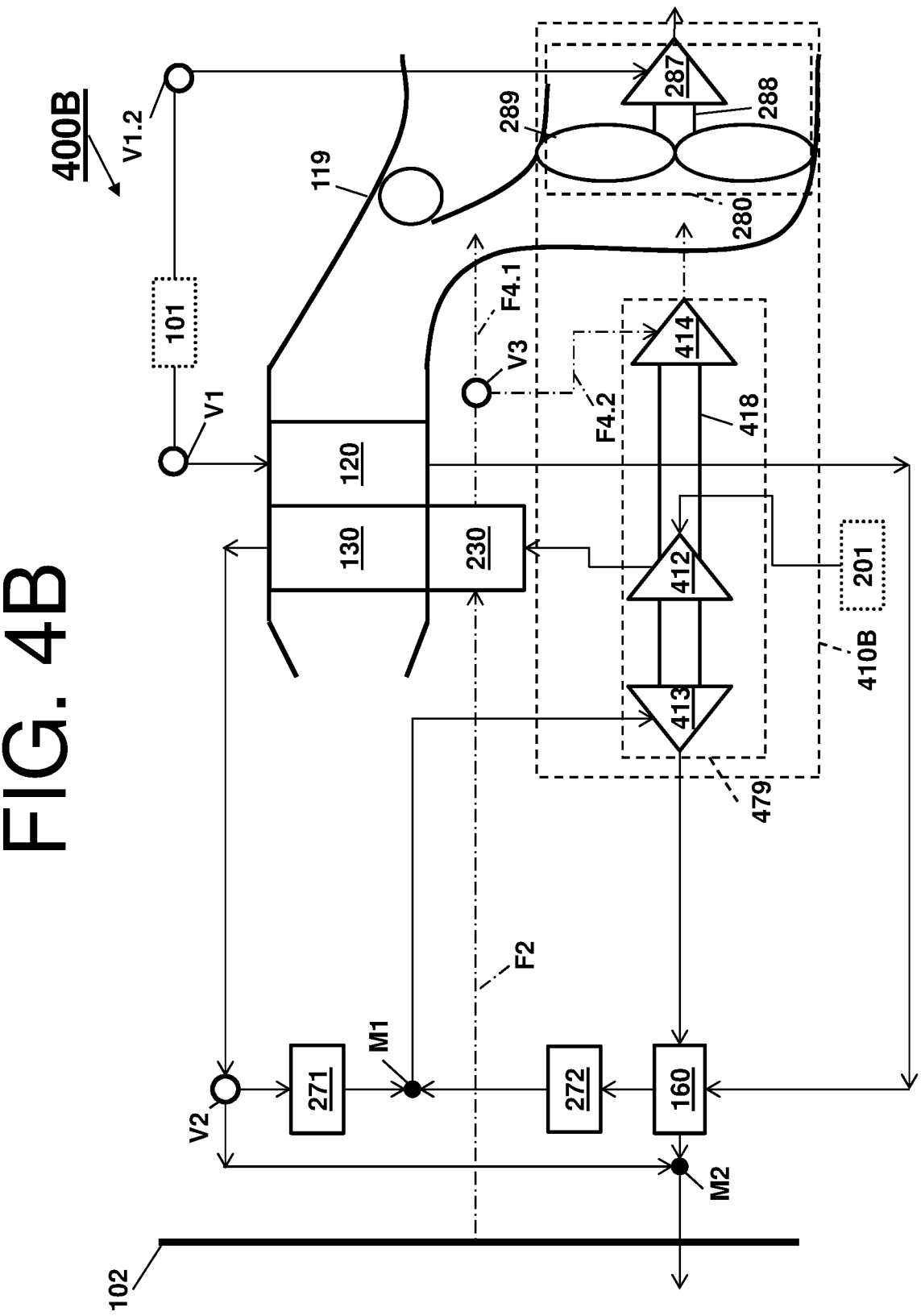
FIG. 4B is a variation of the environmental control system of FIG. 4A according to an embodiment.
Figure 4C:
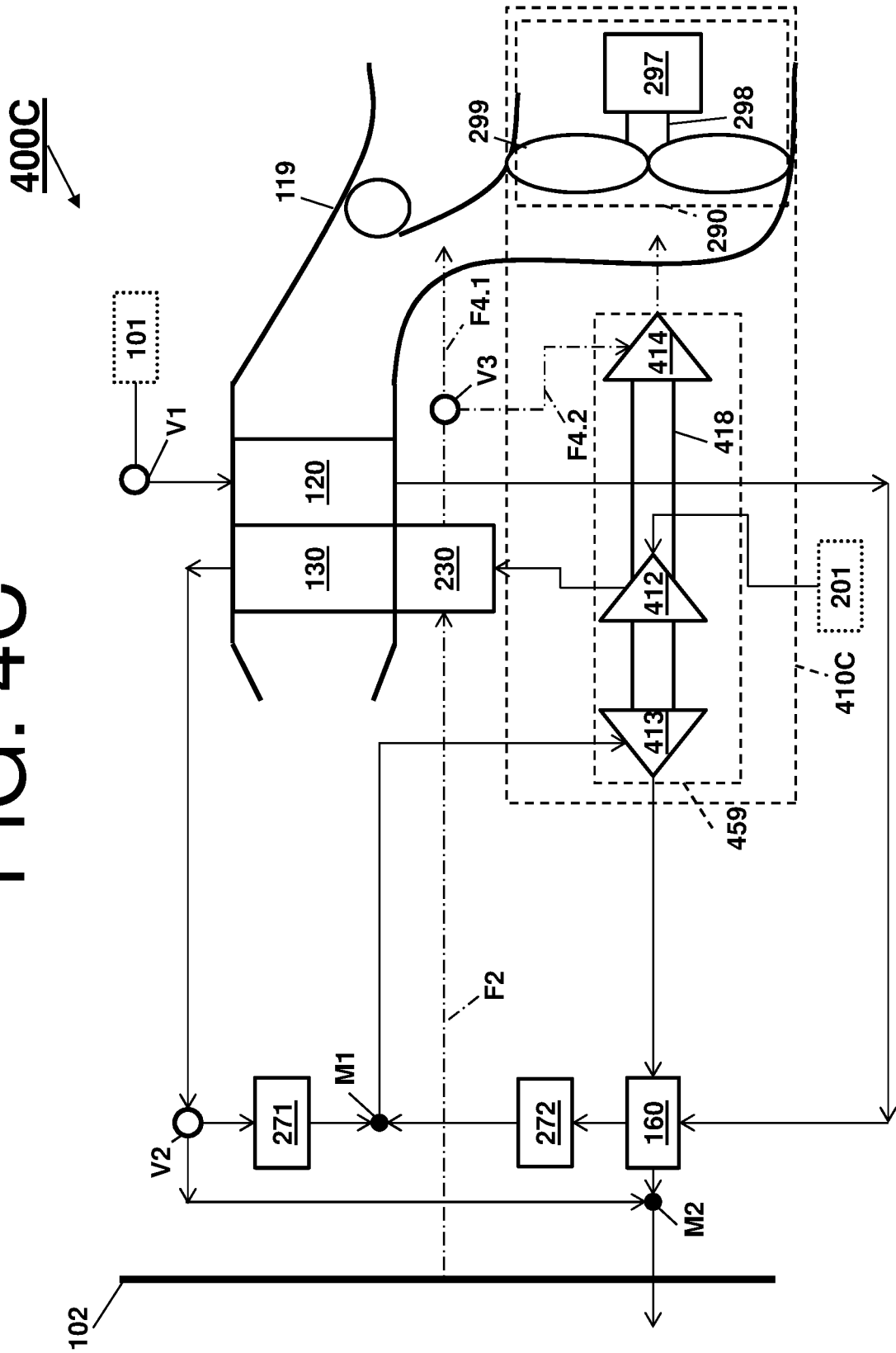
FIG. 4C is a variation of the environmental control system of FIG. 4A according to an embodiment.

Turning now to FIGS. 4A, 4B, and 4C, a schematic of an environmental control systems 400A, 400B, and 400C (e.g., embodiments of systems 100, 200A, 200B, 200C, and 300) are depicted according to embodiments, as they can be installed on an aircraft. In operation, the environmental control systems 400A, 400B, and 400C mix fresh air with bleed air. Components of the systems 100, 200A, 200B, 200C, and 300 that are similar to the environmental control systems 400A, 400B, and 400C have been reused for ease of explanation, by using the same identifiers, and are not re-introduced.

FIG. 4A illustrates the environmental control system 400A to further include a compressing device 410A (that comprises a compressor 412, a turbine 413, a turbine 414, a fan 416, and a shaft 418), along with a path for a medium denoted by dot-dashed lines F4.1 and F4.2. The environmental control system 400A operates similarly to the environmental control system 200A in that different mixing points are utilized based on the mode of operation.

In addition, when the medium is being provided from the chamber 102 (e.g., air leaving a pressurized volume, cabin of the aircraft, or cabin and flight deck of the aircraft), the medium can be referred as chamber discharge air (also known as cabin discharge air). Note that in one or more embodiments, an exhaust of the cabin discharge air from the environmental control system 400A can be released through the shell 119 (e.g., F4.1), sent to a cabin pressure control system, or provided to the turbine 414 (e.g., F4.2).

Further, in high altitude operation, the fresh outside air can be mixed downstream of the turbine 413 rather than upstream and the energy in the cabin discharge air can be used to power the compressor 414 by utilizing the turbine 414. That is, the turbine 414 can be fed hot air via the valve V3 so that the compressor 412 receives power from both the bleed air and the cabin discharge air.

FIGS. 4B and 4C illustrate variations of the environmental control system 400A. In FIG. 4B, a schematic of an environmental control system 400B (e.g., an embodiment of the environmental control system 400A) is depicted according to an embodiment. The environmental control system 400B includes a compressing device 410B that comprises a component 479 and the component 280. The component 479 comprises the compressor 412, the turbine 413, the turbine 414, and the shaft 418. In FIG. 4C, a schematic of an environmental control system 400C (e.g., an embodiment of the environmental control system 400A) is depicted according to an embodiment. The environmental control system 400C includes a compressing device 410C that comprises a component 479 and a component 290. The environmental control systems 400B and 400C operate similarly to the environmental control system 400A in that different mixing points are utilized based on the mode of operation.

Figure 5:
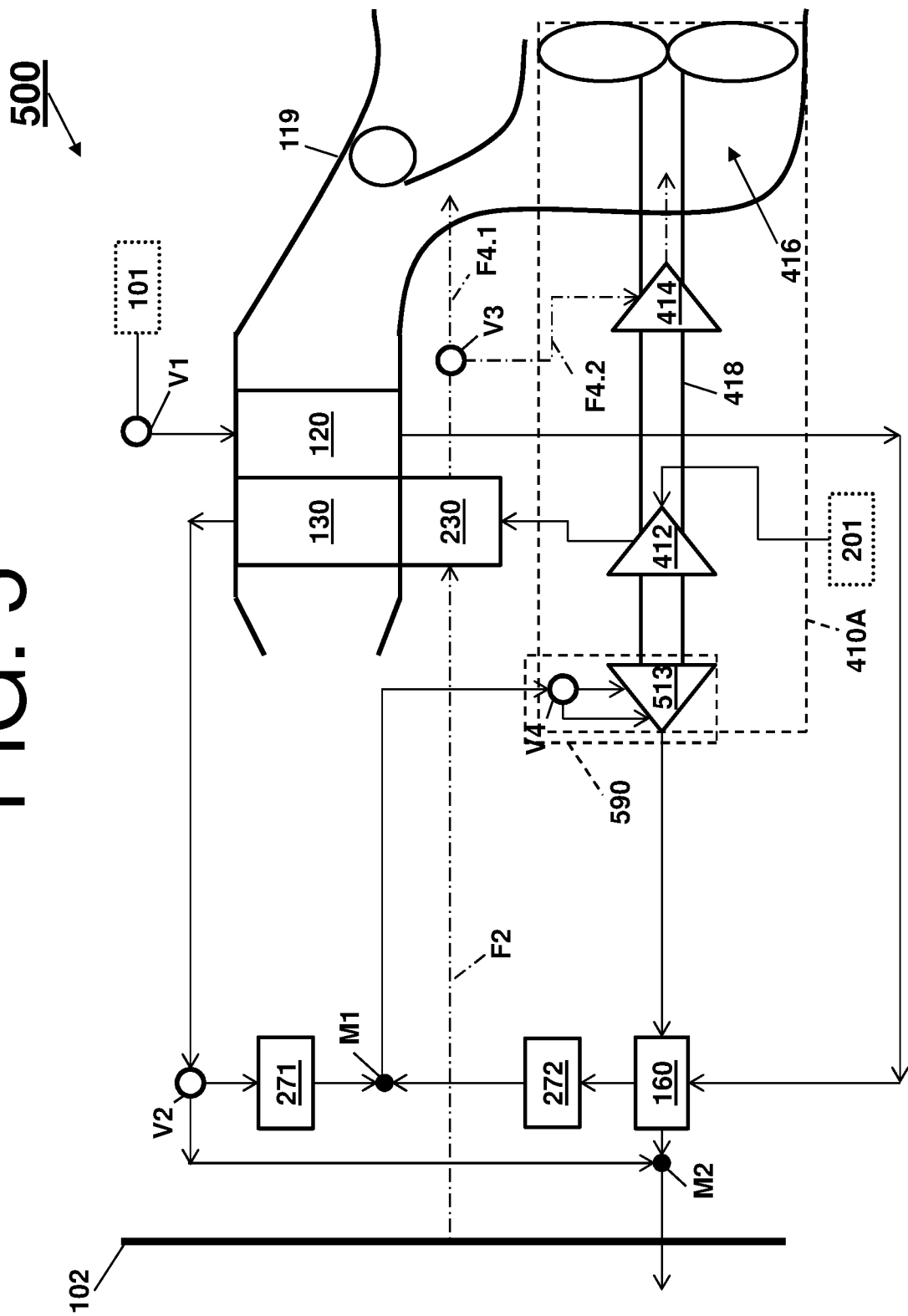
FIG. 5 is a diagram of a schematic of an environmental control system that includes at least one mixing point according to another embodiment.

FIG. 5 illustrates a schematic of an environmental control system 500 as a variation of the environmental control systems 400A, 400B, and 400C according to an embodiment. Components of the systems 100 and 400A, 400B, and 400C that are similar to the environmental control system 400 have been reused for ease of explanation, by using the same identifiers, and are not re-introduced. The environmental control system 400 includes the compressing device 410A comprising a multiple nozzle configuration 590. The multiple nozzle configuration 590 enables a varying nozzle area based on conditions surrounding the aircraft without the added complication of variable area turbine. The operations and arrangements of the multiple nozzle configuration 590 are similar to the multiple nozzle configuration 390 of FIG. 3A and the nozzle configurations 391, 392, 392, 394 of FIG. 3B.

Turning now to FIGS. 6, 7, 8, and 9, schematic of environmental control systems 600, 700, 800, and 900 (e.g., embodiments of the above systems) are depicted, as they can be installed on an aircraft. In operation, the environmental control systems 600, 700, 800, and 900 mix fresh air with bleed air. Components of the above systems that are similar to the environmental control systems 600, 700, 800, and 900 have been reused for ease of explanation, by using the same identifiers, and are not re-introduced.

Figure 6:
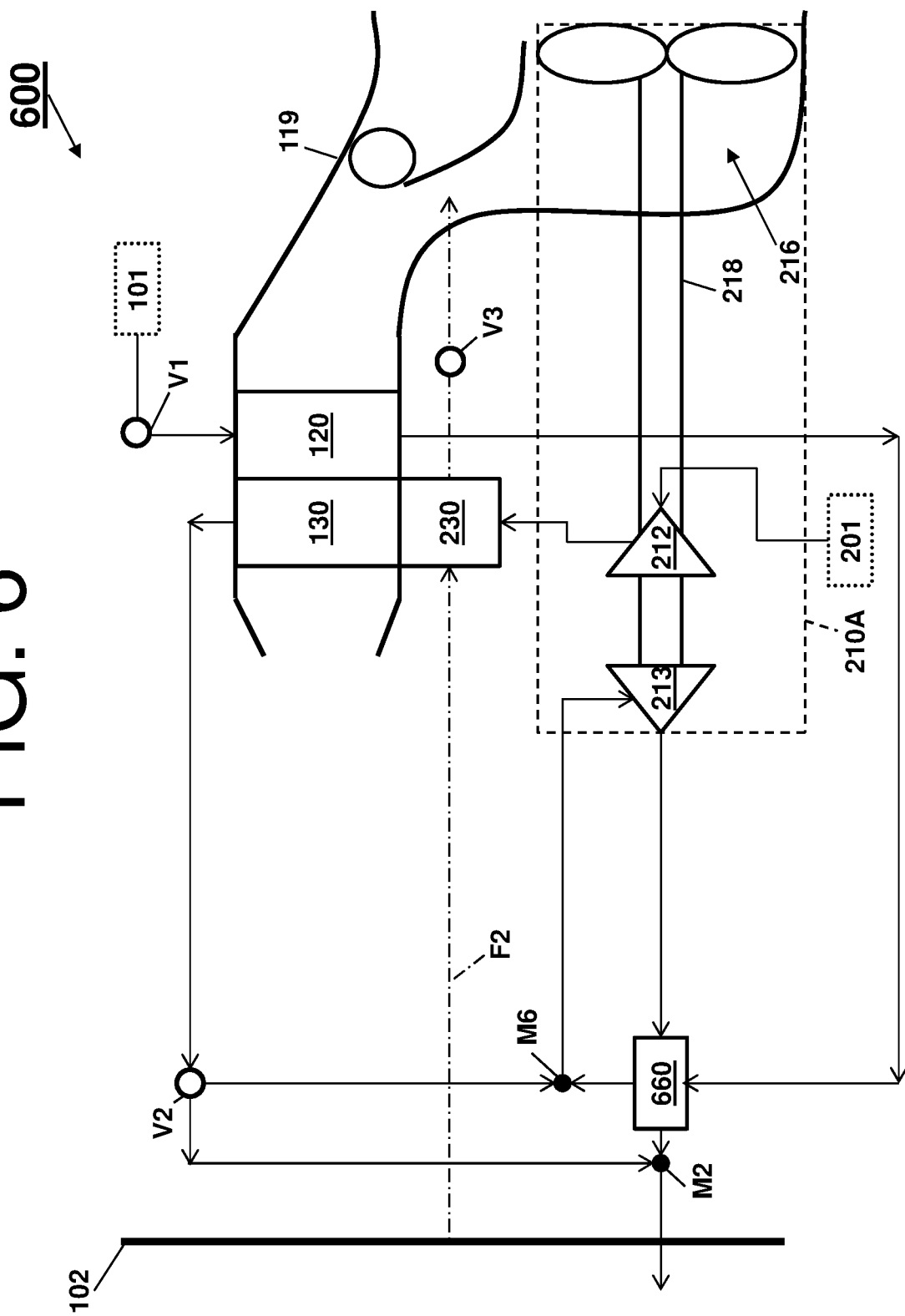
FIG. 6 is a diagram of a schematic of an environmental control system that includes at least one mixing point according to another embodiment.

FIG. 6 is a diagram of a schematic of the environmental control system 600 that includes at least one mixing point M6 according to an embodiment. The environmental control system 600 includes a third heat exchanger 660 (e.g., a condenser) located downstream of the primary heat exchanger 120 in a flow path of the bleed air and located upstream of the mixing point M6.

Figure 7:
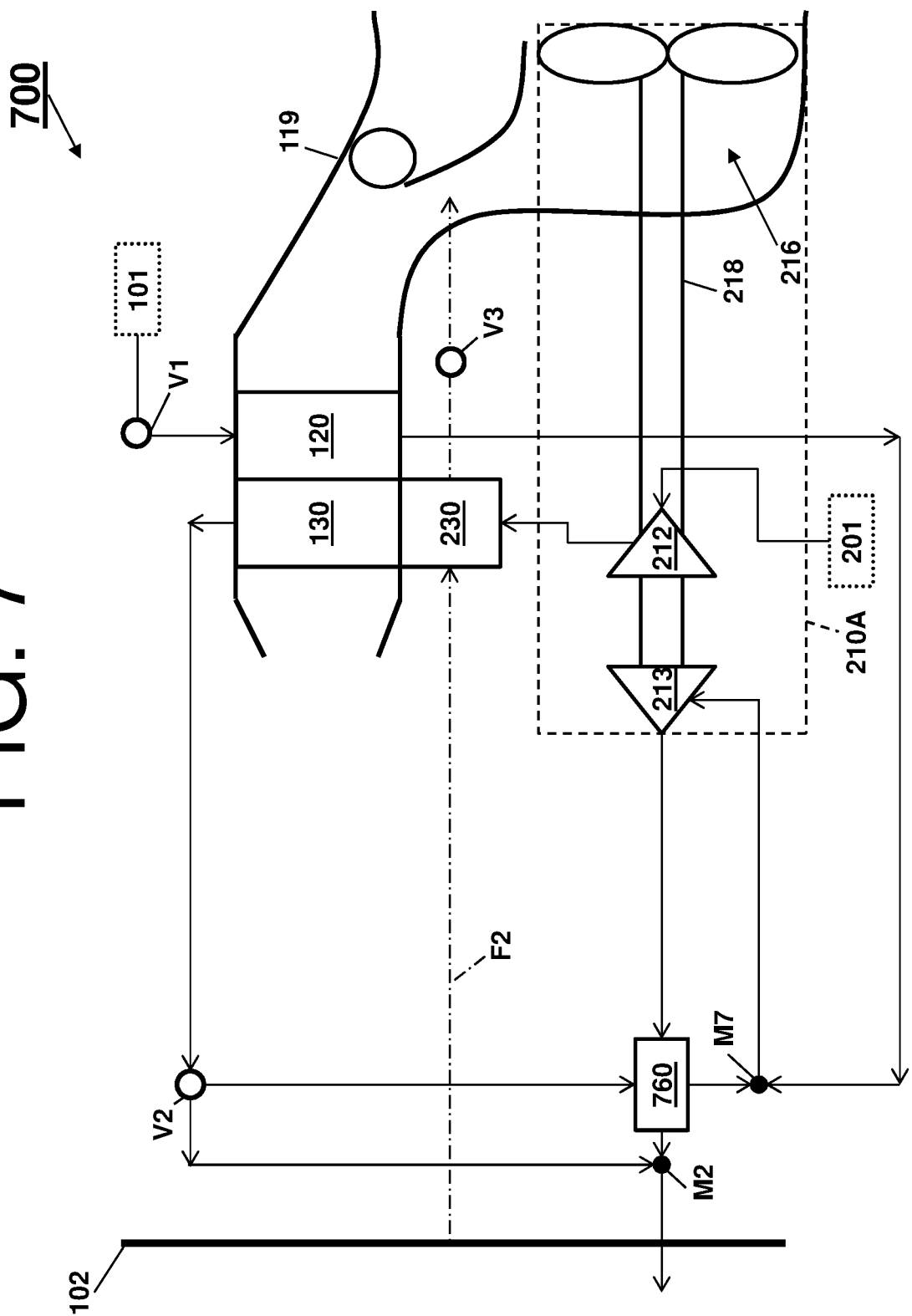
FIG. 7 is a diagram of a schematic of an environmental control system that includes at least one mixing point according to another embodiment.

FIG. 7 is a diagram of a schematic of the environmental control system 700 that includes at least one mixing point M7 according to an embodiment. The environmental control system 700 includes a third heat exchanger 760 (e.g., a condenser) located downstream of the secondary heat exchanger 130 in a flow path of the fresh air and located upstream of the mixing point M7.

Figure 8:
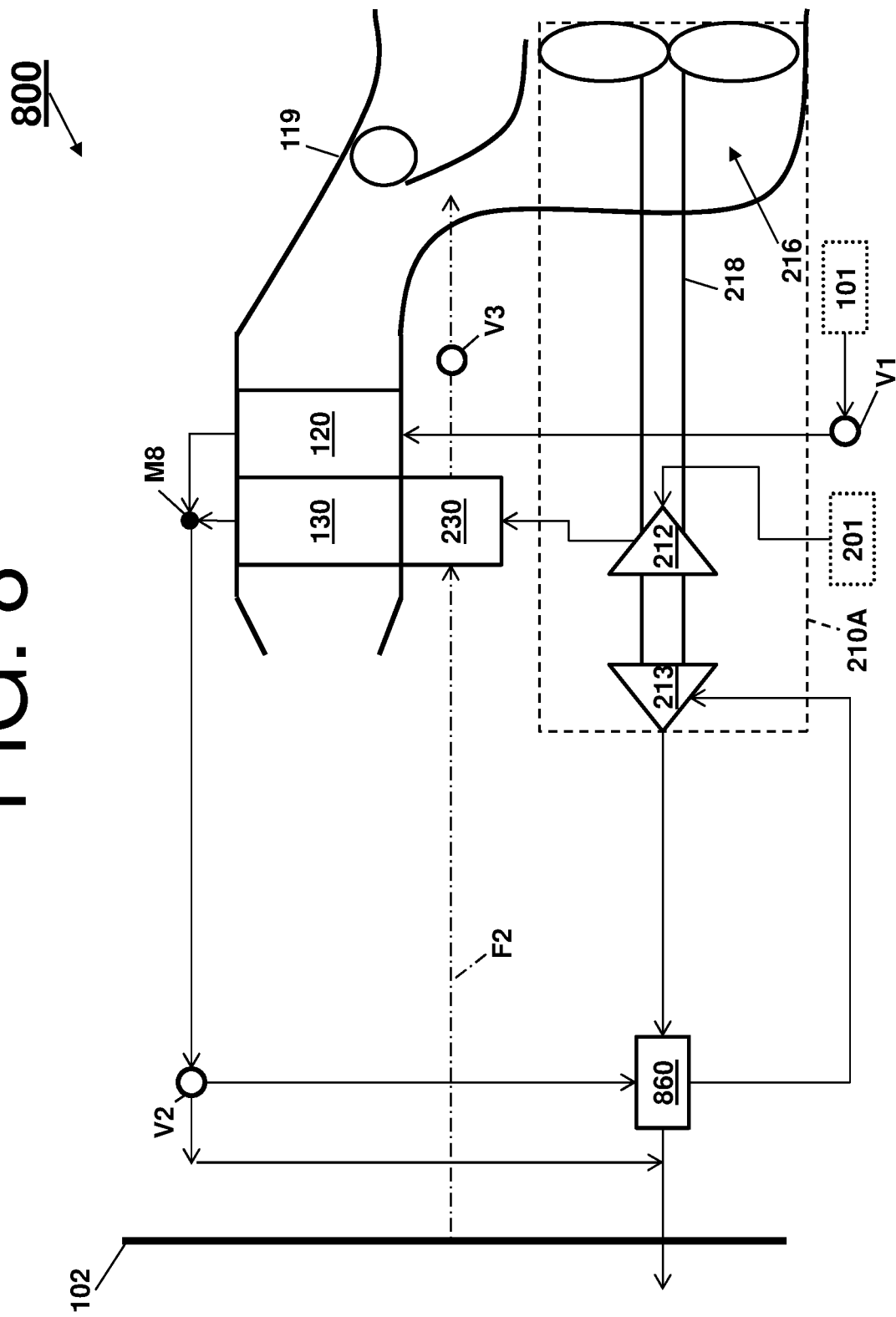
FIG. 8 is a diagram of a schematic of an environmental control system that includes at least one mixing point according to another embodiment.

FIG. 8 is a diagram of a schematic of the environmental control system 800 that includes at least one mixing point M8 according to an embodiment. The environmental control system 800 includes a third heat exchanger 860 (e.g., a condenser) downstream of the mixing point M8.

Figure 9:
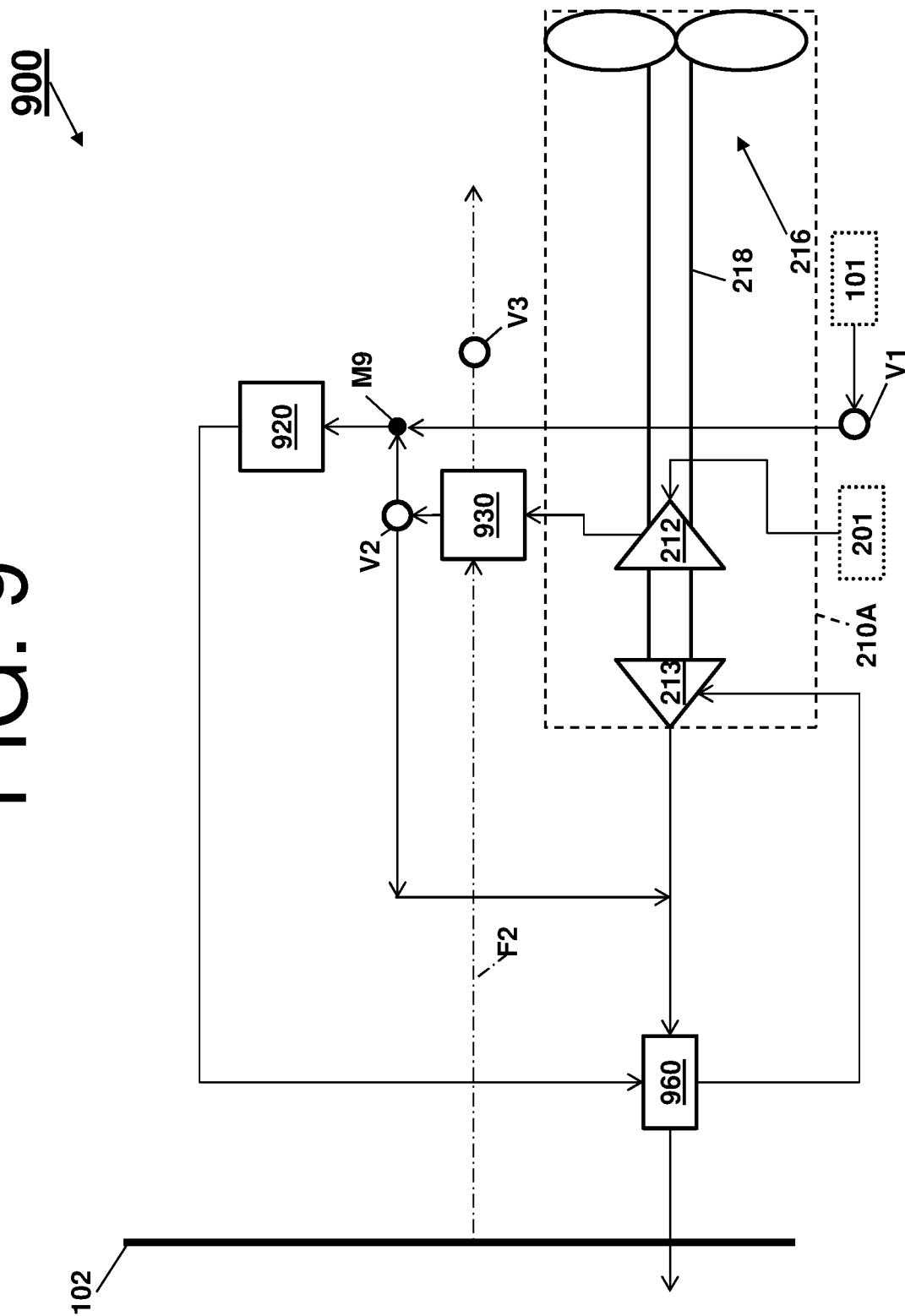
FIG. 9 is a diagram of a schematic of an environmental control system that includes at least one mixing point according to another embodiment.

FIG. 9 is a diagram of a schematic of the environmental control system 800 that includes at least one mixing point M9 according to an embodiment. The environmental control system 900 includes first, second, and third heat exchangers 920, 930, and 960. The first heat exchanger 920 can be similar to a ram air heat exchanger 920 (e.g., in an embodiment this can be a single ram air heat exchanger). The second heat exchanger 930 can be similar to an outflow heat exchanger 230. The third heat exchanger 960 can be similar to a condenser 160. Note that the first heat exchanger 920 is located downstream of the mixing point M9.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. An airplane comprising:
a first medium;
a second medium; and
an air conditioning system comprising:
a first turbine,
a compressor located upstream of the turbine in a flow path of the first medium,
a mixing point at which the first medium mixes with the second medium;
a heat exchanger configured to reject heat from the first medium to a third medium; and
a second heat exchanger configured to reject heat from the second medium to the third medium,
wherein the mixing point is downstream of the compressor and upstream of the turbine,
wherein the mixing point is located downstream of the heat exchanger and the second heat exchanger.

2. The airplane of claim 1, further comprising:
a third heat exchanger located downstream of the heat exchanger in the flow path of the first medium and located upstream of the mixing point.

3. The airplane of claim 1, further comprising:
a third heat exchanger located downstream of the second heat exchanger in a flow path of the second medium and located upstream of the mixing point.

4. The airplane of claim 1, further comprising:
a third heat exchanger downstream of the mixing point.

5. The airplane of claim 4, further comprising:
a flow of a fourth third medium.

6. The airplane of claim 5, wherein the fourth medium comprises cabin discharge air.

7. The airplane of claim 5, further comprising:
a fourth heat exchanger rejecting heat from the first medium to the fourth medium.

8. The airplane of claim 5, further comprising:
a second turbine configured to receive a flow of the fourth medium and to power the compressor.

* * * * *